Dec. 4, 1956     I. W. DOYLE     2,772,479
APPARENT-VELOCITY RESPONSIVE SYSTEM
Filed June 14, 1955
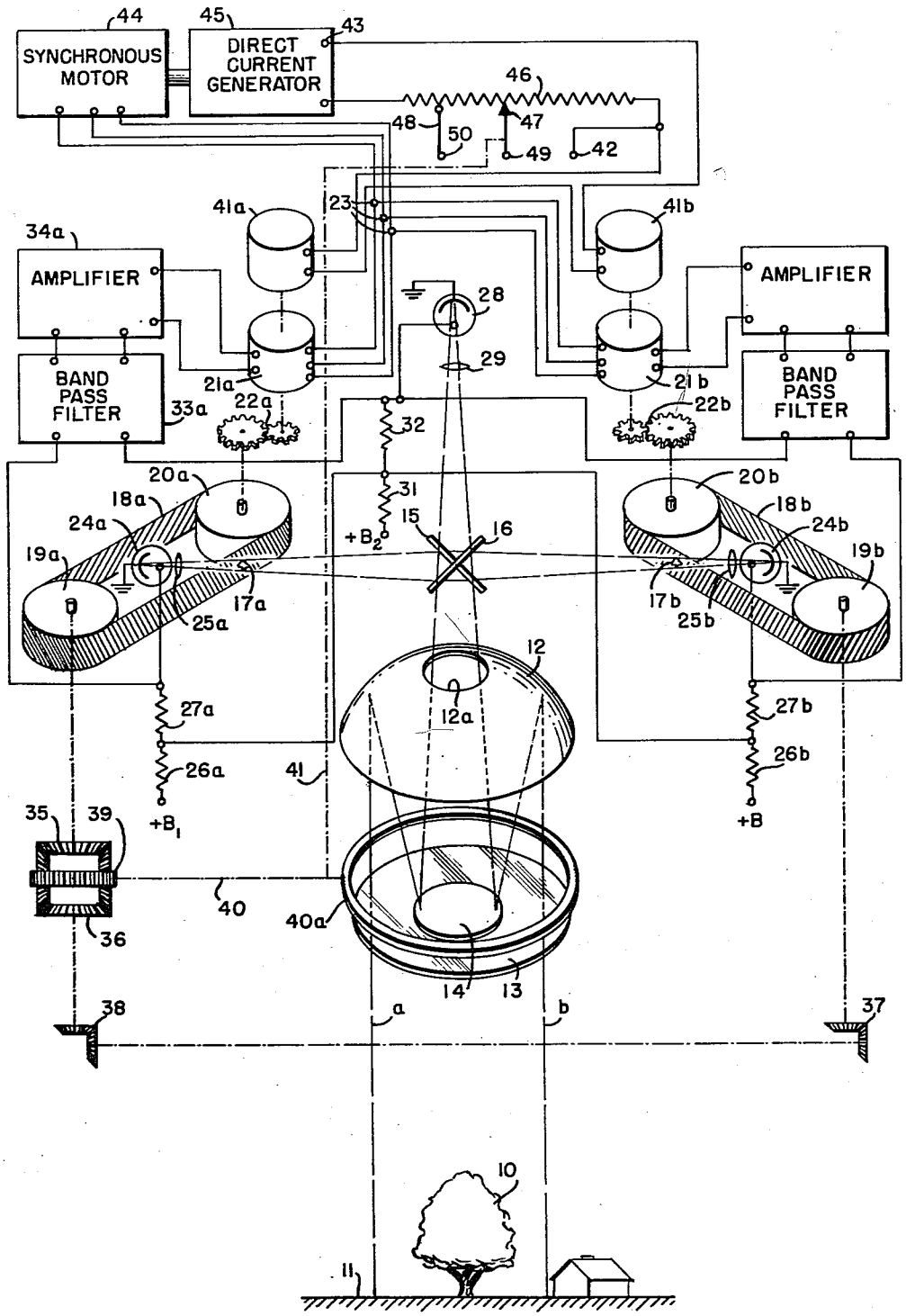

United States Patent Office 2,772,479
Patented Dec. 4, 1956

2,772,479

APPARENT-VELOCITY RESPONSIVE SYSTEM

Irving W. Doyle, Massapequa, N. Y., assignor to Fairchild Camera and Instrument Corporation, a corporation of Delaware Application June 14, 1955, Serial No. 515,364

13 Claims. (Cl. 33—46.5)

This invention relates to apparent-velocity responsive systems and, while it is of general application, it is particularly suitable for measuring the apparent ground velocity of an aircraft in flight, the apparent velocity being defined as the ratio of the actual ground velocity V to the altitude H.

Heretofore there have been devised a number of apparent-velocity responsive systems, one common form comprising an optical system forming an image of the ground at the focal plane where there is located a grid transverse to the direction of motion. Light from the image is converged on a photocell which develops a periodic electrical signal of a frequency varying with the apparent-velocity ratio V/H. One such system is disclosed in Hancock et al. Patent No. 2,413,349 which includes a frequency discriminator for deriving from the developed periodic signal an apparent-velocity measurement varying with the frequency of such signal.

The operation of apparent-velocity responsive systems of the type described has been heretofore limited in two respects: (1) a limited altitude range, as determined by the signal-to-noise ratio; and (2) a limited range of apparent velocities, as determined by the measurable range of frequencies of the developed periodic signal. In addition, such systems have heretofore afforded an indication only of the apparent velocity in the direction of relative movement, while it is frequently desired to measure the apparent velocity in the direction of the heading of the aircraft.

For example, in a recent application for an apparent-velocity responsive system it was desired that the apparatus work over a range of ground speeds of 175–700 knots at an altitude of 200 feet and a range of ground speeds of 350–700 knots at altitudes up to 60,000 feet, resulting in a range of frequency variation of the developed periodic signal of 600 to 1. In prior apparent-velocity responsive systems of the type described, operation has been virtually limited by signal-to-noise ratio to altitudes of the order of 20,000 feet and to a range of frequency variation of the periodic signal of the order of 100 to 1.

It is an object of the present invention, therefore, to provide a new and improved apparent-velocity responsive system which obviates one or both of the limitations on the operating range of the system found in prior systems of this type.

It is another object of the invention to provide a new and improved apparent-velocity responsive system capable of satisfactory operation over an extremely wide altitude range.

It is a further object of the invention to provide a new and improved apparent-velocity responsive system capable of satisfactory operation over a wide range of apparent velocities.

It is a still further object of the invention to provide a new and improved apparent-velocity responsive system which develops effects individually representative of the apparent velocity in the direction of relative motion as well as in the direction of heading.

It is further an object of the invention to provide a new and improved apparent-velocity responsive system of the type described which simultaneously and automatically determines the drift angle of the craft carrying the system.

In accordance with the invention, there is provided a system responsive to the apparent velocity of a relatively moving object over a predetermined range of velocities comprising optical means for forming at a focal plane an image of the relatively moving object, an elongated transparent strip having an opaque transverse repetitive pattern disposed substantially in the focal plane of the optical means and movable thereby in the direction of image motion, and motor means for continuously driving the elongated strip. The system also includes photoelectric means for developing a periodic electrical signal of a frequency varying with the velocity of the image at the focal plane relative to the repetitive pattern of the elongated strip, circuit means responsive to such electrical signal for regulating the speed of the motor means in a sense to reduce the range of frequency variation of the signal as the apparent velocity of the object varies over its predetermined range, and means responsive to the frequency of the periodic signal for developing an effect representative of the apparent image velocity.

For a better understanding of the present invention, together with other and further objects thereof, reference is had to the following description taken in connection with the accompanying drawing, while its scope will be pointed out in the appended claims.

The single figure of the drawing is a schematic representation of a complete apparent-velocity responsive system embodying the invention.

Referring now more particularly to the drawing, there is represented a system responsive to the apparent velocity of a relatively moving object in the direction of relative movement over a range of velocities. It is assumed that the system is carried on an aircraft in flight so that the relative movement is between the aircraft and ground. The system includes optical means for forming at each of two focal planes displaced transversely of the direction of relative movement an image of the relatively moving object, such as a tree 10 on the ground 11. The optical means is illustrated as a folded Maksutof reflecting system comprising a spherical reflector 12, a spherical refracting corrector lens 13, a reflector 14 in the center of the corrector 13 and a pair of crossed half-reflecting transparent plates 15, 16. The reflector 12 has a central aperture 12a through which the image reflected from the element 14 passes. The path of the light rays through the optical system is represented by the paths a, b at the extremes of the optical field at the ground 11. It is seen that the half-reflecting plate 15 brings the image to a focus at a focal plane 17a, while the half-reflecting plate 16 forms a second image of the ground at the focal plane 17b, the two planes 17a, 17b being displaced transversely in the drawing on the assumption that the direction of travel of the aircraft is normal to the plane of the drawing. In order to form sharp images at the planes 17a, 17b, it is desirable that the optical system have a long focal length, for example, of the order of 18 inches.

The velocity-responsive system of the invention also comprises a pair of elongated translucent strips, for example, endless belts 18a, 18b having oppositely inclined opaque repetitive patterns, such as the oppositely inclined transverse grid patterns, as illustrated. One course of each of the endless belts 18a, 18b is disposed substantially in its associated focal plane 17a or 17b, respectively, and it is movable thereby in the direction of image motion at the focal plane. By the term "in the direction of image motion" is meant in the line of image motion irrespective of the sense of the motion. The endless belt 18a is mounted on a pair of drums or pulleys 19a, 20a, the latter of which is continuously driven by motor means such as a synchro 21a through speed-reduction gearing 22a. The synchro 21a may be of conventional construction, including a constant-frequency three-phase stator connected to the three-phase supply terminals 23 and a rotor connected to be excited with a periodic signal developed as described hereinafter.

The velocity-responsive system of the invention also includes photoelectric means responsive to the images on the strips or belts 18a, 19a for developing periodic electrical signals of frequencies individually varying with the velocities of the images at the focal planes 17a, 17b relative to their respective repetitive patterns and including undesired unidirectional and low-frequency components. For example, the photoelectric means associated with the belt 18a includes a photocell 24a and optical means, such as a condensing lens 25a, for focusing on the photocell the image of the ground on the belt 18a. The photoelectric means also comprises circuit means including the photocell 24a for developing a periodic signal. Specifically, the cell 24a may be of the photoconductive type and the circuit means may comprise a source of positive potential $+B_1$ connected to one electrode of the photocell 24a through an isolating resistor 26a and a load resistor 27a. Preferably the optical system is designed to operate from infrared radiation, in which case the cell 24a may be of the lead sulphide type.

The velocity-responsive system of the invention also includes photoelectric means for balancing out the undesired components of the periodic electrical signal developed across the load resistor 27a of the photocell 24a, this balancing out being accomplished by an effective "push-pull" arrangement. For example, the system includes a photocell 28 and optical means for focusing on this photocell an image of the ground similar to that on each of the focal planes 17a, 17b but independent of the repetitive patterns on the associated belts 18a, 18b for developing another periodic electrical signal. Specifically, the half-reflecting plates 15, 16 split the image beam from the Maksutof optical system, a portion of the beam passing directly through the plates 15, 16 and through a converging lens 29 which converges the image onto one electrode of the cell 28. The other electrode of photocell 28 is connected to a source $+B_2$ through an isolating resistor 31 and a load resistor 32.

The velocity-responsive system also includes circuit means responsive to the periodic electrical signals developed across the load resistors 27a and 32 of the photocells 24a and 28, respectively, specifically, differentially responsive to these two signals, for regulating the speed of the motor means 21a in a sense to reduce the range of frequency variation of the signals developed across the load resistor 27a as the apparent velocity of the ground varies over the operating range of the system. Specifically, the load resistors 27a and 32 are connected in series opposition in the input circuit of a bandpass filter 33a, the output circuit of which is connected to the input circuit of an amplifier unit 34a the output circuit of which, in turn, is connected to the rotor of the synchro 21a. The velocity-responsive system of the invention also includes an assembly of components associated with the endless belt 18b identical to those associated with the endless belt 18a and identified by the same reference numerals with the subscript "b."

The velocity-responsive system of the invention also includes differential means responsive to inequality of the apparent velocities of the images at their respective focal planes 17a, 17b for adjusting the orientation of the system to restore the apparent image velocities to equality. Specifically, the drum 19a is connected to drive one input gear 35 of a differential mechanism, while the other input gear 36 is driven by the drum 19b through suitable gearing 37, 38. The ring gear 39 is connected to rotate or orient the velocity-responsive system to restore the frequencies of the periodic signals developed across the load resistors 27a, 27b to equality, as described hereinafter. Specifically, the ring gear 39 is connected by conventional driving mechanism represented schematically at 40 to rotate a frame member 40a pivotally supported from the frame of the aircraft about the axis of reflector 13, which may be mounted in stationary relation to the aircraft.

The velocity-responsive system also comprises means responsive to the speed of the motor means, such as the rotor of synchro 21a, for developing an effect representative of the apparent image velocity, that is, of the apparent ground speed of the aircraft on which the system is mounted. This latter means comprises a pair of direct-current electrical generators 41a, 41b individually driven by the synchros 21a, 21b, respectively, their output circuits being connected in series aiding, as indicated, so that between the terminals 42, 43 there is developed an electrical signal having a direct voltage, the value and polarity of which are, at any given frequency of the supply circuit 23, representative of the ground speed of the aircraft.

In normal operation of an aircraft, the frequency of the supply terminals 23 may be subject to considerable variation, resulting in corresponding variations in the speeds of the synchros 21a, 21b and in the voltages of the generators 41a, 41b. To compensate for such variations there is provided a synchronous motor 44 energized from supply terminals 23 and connected to drive a direct-current generator 45, the output terminals of which are connected in series with the terminals 42, 43 through a voltage-divider resistor 46 having an adjustable contact 47. The polarity and value of the output signal of generator 45 are selected to be equal and opposite to the resultant of the signal outputs of generators 41a, 41b for zero image speed at the belts 18a, 18b. The contact 47 is connected to be actuated by the ring gear 39 of the differential mechanism through a drive mechanism represented schematically at 40, 41 whereby, as explained hereinafter, the signal appearing between the terminal 42 and terminal 49 connected to the adjustable contact 47 is representative of the apparent image velocity of the aircraft in the heading direction, while the signal appearing between the terminal 42 and terminal 50 connected to a fixed tap 48 is representative of the apparent velocity of the aircraft relative to ground, that is, of the absolute apparent ground speed.

In describing the operation of the apparent-velocity responsive system described above, it may be assumed that initially the aircraft is moving in the direction of its heading. It is also assumed that the aircraft is flying with an apparent ground speed of an intermediate value in its operating range. Under these conditions, the synchros 21a, 21b drive the drums 20a, 20b, respectively, in senses such that the oppositely inclined grid patterns on the endless belts 18a, 18b move past the focal planes 17a, 17b in the direction of movement of the ground images at these focal planes. As a result, the principal frequency of the fluctuating light beams focussed on the photocells 24a, 24b are representative of the differential velocities of the images and the grid patterns in the focal planes. These fluctuations are effective to develop periodic electrical signals of the same frequency across the load resistors 27a, 27b. If there are present in the periodic signal developed across resistor 27a unidirectional or low-frequency components representative of large area differences in illumination or in elevation or the like, similar unidirectional and low-frequency components are developed across load resistor 32 of photocell 28, although no high-frequency components are developed across this resistor due to the absence of a grid pattern in its image path. The load resistors 27a and 32 are connected in series opposition and, by appropriately proportioning the circuit constants relative to the sensitivities of the photocells 24a, 28, taking into account the average light-transmitting efficiencies of the optical paths to these two photocells, the unidirectional and low-frequency components cancel each other and there is applied to the input circuit of bandpass filter 33a a fluctuating electrical signal, of which the principal component is a periodic signal of a frequency corresponding to the differential velocity of the ground image at the plane 17a relative to the moving belt 18a. This electrical signal is filtered by the unit 33a passed on to the amplifier 34a and thence to the rotor of the synchro 21a. The synchro 21a obviously rotates at a speed corresponding to the difference between the frequencies of the signals applied to its stator and its rotor.

For example, it may be assumed that the design constants of the system are so chosen that for the entire operating range of zero to 100 inches per second image speed at each of the focal planes, there is developed across the load resistor 27a a signal having a frequency within the range of 300 to 500 cycles per second. Then the frequency of the signal output of photocell 24a is 300 cycles per second for zero image velocity and 500 cycles per second for image velocity of 100 inches per second. If it is assumed that the grid patterns of the belts 18a, 18b comprise 8 lines per inch, then the speed of the belts 18a, 18b is 37½ inches per second in one direction for zero image speed and 37½ inches per second in the other direction for an image speed of 100 inches per second. In other words, the relative belt-image speed is 37½ inches per second for zero image velocity, 50 inches per second for an image velocity of 50 inches per second, and 62½ inches per second at an image speed of 100 inches per second. These relative belt-image speeds develop signals of frequencies of 300, 400, and 500 cycles, respectively. With signals of these frequencies applied to the rotor of the synchro 21a, assuming that its stator is energized with a 400-cycle current from the terminals 23, there results in rotation of the synchro shaft at speeds of —100, zero, and +100 R. P. S., respectively. It is then only necessary to select the proper gear reduction ratio in the gearing 22a, 22b and the proper diameters for the drums 20a, 20b to produce the speeds of the endless belt 18a just described. Thus it is seen that the driving system for the drum 20a and its belt 18a effectively comprises a frequency-compression system to compress the desired signal-frequency range of 600 to 1 into a frequency range of 5 to 3.

Obviously the endless belt 18b and its associated elements similarly produce across the load resistor 27b of photocell 24b a periodic electrical signal varying over a similarly compressed frequency range. The synchros 21a, 21b individually drive the direct-current generators 41a, 41b which, in a conventional manner, develop direct voltages of values and polarities varying with their driving speeds. These generators are connected in series aiding so that there is developed between the terminals 42 and 43 a resultant direct voltage which, at a given frequency, is representative of the apparent image velocity at the focal planes 17a, 17b, and thus of the apparent ground speed of the aircraft in the direction of movement.

If now it be assumed that the frequency of the supply line 23 drops by 10%, that is, from 400 to 360—other conditions remaining the same, the mechanical speeds of all the moving elements at zero image speed decrease proportionately. That is, the belt speed decreases to 33.75 inches per second, the frequency of the signal output of photocell 24a decreases to 270 cycles, and the speed of the synchro 21a decreases to 90 R. P. S. At the same time the signal outputs of generators 41a, 41b also drop 10%. If the system so far considered were properly calibrated for a supply frequency of 400 cycles, the resultant output signal at terminals 42, 43 would now be in error by 10%. However, the output of generator 45, driven by motor 44, simultaneously varies by the same percent. If the generator 45 is selected to have a signal equal and opposite to the resultant of the signal outputs of generators 41a, 41b at zero image speed at belts 18a, 18b, then the output signal between terminals 42 and 50 will be zero at zero image speed and will vary substantially linearly with image speed over a wide range of supply circuit frequencies. The relations are shown more clearly in the following table in which the signal output of each of generators 41a and 41b is assumed to be 50 volts and the output of generator 45, 100 volts:

APPARENT-VELOCITY RESPONSIVE SYSTEM

*Typical operating data*

| Image speed | 0″/sec. | 50″/sec. | 100″/sec. |
|---|---|---|---|
| Supply Frequency—400 cycles: | | | |
| Belt speed_____inches per second__ | −37½ | 0 | +37½ |
| Relative image-belt speed____do____ | 37½ | 50 | 62½ |
| Photocell output frequency_cycles__ | 300 | 400 | 500 |
| Synchro speed revolutions per second__ | −100 | 0 | +100 |
| Output—generators 41a and 41b volts__ | −100 | 0 | +100 |
| Output—generator 45_____do____ | +100 | +100 | +100 |
| Output signal_____do____ | 0 | +100 | +200 |
| Supply Frequency—360 cycles: | | | |
| Belt speed_____inches per second__ | −33.75 | +3.75 | +41.25 |
| Relative image-belt speed____do____ | 33.75 | 46.25 | 58.75 |
| cell frequency_____cycles__ | 270 | 370 | 470 |
| synchro speed revolutions per second__ | −90 | +10 | +110 |
| Output—generators 41a and 41b volts__ | −90 | +10 | +110 |
| Output—generator 45_____do____ | +90 | +90 | +90 |
| Output signal_____do____ | 0 | +100 | +200 |

In case the aircraft is subject to a cross wind, it will not be heading in the direction of relative ground movement, the angle between such relative movement and the heading being known as the crab angle. In order to obtain the apparent velocity in the line with the heading, the relative ground speed must be multiplied by the cosine of the crab angle. To this end, the grid patterns on the belts 18a and 18b are oppositely inclined in the direction of movement. If the velocity-responsive system as a whole is oriented parallel to the heading of the plane, but the plane is not headed in the direction of movement, the frequency of the signal developed by one of the photocells, for example, the photocell 24a is increased and that developed by the photocell 24b is correspondingly decreased. Due to the frequency-compression system described, the drums 20a and 20b will be driven at correspondingly different speeds and these speeds are transmitted through the belts 18a, 18b, the drums 19a, 19b, and the differential mechanism 35, 36, 39 so that the ring gear 39 rotates to adjust the whole velocity-responsive system to re-orient it in such manner as to restore the equality between the frequencies of the signals developed by the two photoelectric means. When these frequencies are restored to equality, as described, the adjustment of the velocity-responsive system relative to the axis of the aircraft is a measure of the crab angle of the plane. This adjustment is transmitted over the mechanism 40, 41 to the adjustable contact 47 of voltage divider 46. The sense of adjustment of the contact 47 and the taper of the resistor 46 over the range of adjustment of contact 47 is such that effectively the voltage appearing between terminals 42 and 49 is equal to that appearing between the terminals 42, 50 multiplied by the cosine of the crab angle and thus is representative of the component of the apparent velocity of the aircraft in the direction of its heading. At the same time, the adjustment of the velocity-responsive system by the ring gear 39 and mechanism 40 is representative of the crab angle of the aircraft in flight.

In the design of the velocity-responsive system of the invention, it is desirable that the viewing angle of the Maksutof optical system be an optimum. If it is too wide, it includes an integrated signal component which is large relative to the useful signal component and is relatively more difficult to balance out. If the viewing angle is too narrow, there is developed a relatively large signal component representative of the ground details which is difficult to filter out. It is desirable to utilize a viewing angle which at the focal planes encompasses from 10 to 100 bars of the grid pattern, while for a sharp image forming system, the grid pattern should be relatively fine, having of the order of 10 to 100 lines per inch.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A system responsive to the apparent velocity of a relatively moving object over a predetermined range of velocities comprising: optical means for forming at a focal plane an image of the relatively moving object; an elongated translucent strip having an opaque transverse repetitive pattern disposed substantially in said focal plane and movable thereby in the direction of image motion; motor means for continuously driving said strip; photoelectric means for developing a periodic electrical signal of a frequency varying with the velocity of the image at the focal plane relative to said repetitive pattern; circuit means responsive to said electrical signal for regulating the speed of said motor means in a sense to reduce the range of frequency variation of said signal as the apparent velocity of the object varies over said predetermined range; and means responsive to the frequency of said signal for developing an effect representative of the apparent image velocity.

2. A system responsive to the apparent velocity of a relatively moving object over a predetermined range of velocities comprising: optical means for forming at a focal plane an image of the relatively moving object; an endless translucent belt having an opaque transverse grid pattern disposed substantially in said focal plane and movable thereby in the direction of image motion; motor means for continuously driving said belt; photoelectric means for developing a periodic electrical signal of a frequency varying with the velocity of the image at the focal plane relative to said grid pattern; circuit means responsive to said electrical signal for regulating the speed of said motor means in a sense to reduce the range of frequency variation of said signal as the apparent velocity of the object varies over said predetermined range; and means responsive to the frequency of said signal for developing an effect representative of the apparent image velocity.

3. A system responsive to the apparent velocity of a relatively moving object over a predetermined range of velocities comprising: optical means for forming at a focal plane an image of the relatively moving object; an elongated translucent strip having an opaque transverse repetitive pattern disposed substantially in said focal plane and movable thereby in the direction of image motion; a synchro including a constant-frequency stator and a rotor for continuously driving said strip; photoelectric means for developing a periodic electrical signal of a frequency varying with the velocity of the image at the focal plane relative to said repetitive pattern; circuit means for applying said electrical signal to said rotor to reduce the range of frequency variation of said signal as the apparent velocity of the object varies over said predetermined range; and means responsive to the frequency of said signal for developing an effect representative of the apparent image velocity.

4. A system responsive to the apparent velocity of a relatively moving object over a predetermined range of velocities comprising: optical means for forming at a focal plane an image of the relatively moving object; an elongated translucent strip having an opaque transverse repetitive pattern disposed substantially in said focal plane and movable thereby in the direction of image motion; a synchro including a constant-frequency stator and a rotor for continuously driving said strip; photoelectric means for developing a periodic electrical signal of a frequency varying with the velocity of the image at the focal plane relative to said repetitive pattern; circuit means including a bandpass filter and an amplifier for applying said electrical signal to said rotor to reduce the range of frequency variation of said signal as the apparent velocity of the object varies over said predetermined range; and means responsive to the frequency of said signal for developing an effect representative of the apparent image velocity.

5. A system responsive to the apparent velocity of a relatively moving object over a predetermined range of velocities comprising: optical means for forming at a focal plane an image of the relatively moving object; an elongated translucent strip having an opaque transverse repetitive pattern disposed substantially in said focal plane and movable thereby in the direction of image motion; motor means for continuously driving said strip; a photocell; optical means for focusing on said photocell the image on said strip; circuit means including said photocell for developing a periodic electrical signal of a frequency varying with the velocity of the image at the focal plane relative to said repetitive pattern; circuit means responsive to said electrical signal for regulating the speed of said motor means in a sense to reduce the range of frequency variation of said signal as the apparent velocity of the object varies over said predetermined range; and means responsive to the frequency of said signal for developing an effect representative of the apparent image velocity.

6. A system responsive to the apparent velocity of a relatively moving object over a predetermined range of velocities comprising: optical means for forming at a focal plane an image of the relatively moving object; an elongated translucent strip having an opaque transverse repetitive pattern disposed substantially in said focal plane and movable thereby in the direction of image motion; motor means for continuously driving said strip; photoelectric means for developing a periodic electrical signal of a frequency varying with the velocity of the image at the focal plane relative to said repetitive pattern; circuit means responsive to said electrical signal for regulating the speed of said motor means in a sense to reduce the range of frequency variation of said signal as the apparent velocity of the object varies over said predetermined range; and an electrical generator driven by said motor means for developing a second electrical signal representative of the apparent image velocity.

7. A system responsive to the apparent velocity of a relatively moving object over a predetermined range of velocities comprising: optical means for forming at a focal plane an image of the relatively moving object; an elongated translucent strip having an opaque transverse repetitive pattern disposed substantially in said focal plane and movable thereby in the direction of image motion; motor means for continuously driving said strip; photoelectric means for developing a periodic electrical signal of a frequency varying with the velocity of the image at the focal plane relative to said repetitive pattern; circuit means responsive to said electrical signal for regulating the speed of said motor means in a sense to reduce the range of frequency variation of said signal as the apparent velocity of the object varies over said predetermined range; and a direct-current generator driven by said motor means for developing a voltage of a value representative of the apparent image velocity.

8. A system responsive to the apparent velocity of a relatively moving object over a predetermined range of velocities comprising: optical means for forming at a focal plane an image of the relatively moving object; an elongated translucent strip having an opaque transverse repetitive pattern disposed substantially in said focal plane and movable thereby in the direction of image motion; motor means for continuously driving said strip; photoelectric means responsive to the image on said strip for developing a periodic electrical signal of a frequency varying with the velocity of the image at the focal plane relative to said repetitive pattern and including undesired unidirectional and low-frequency components; photoelectric means for balancing out said undesired components of said electrical signal; circuit means responsive to said electrical signal for regulating the speed of said motor means in a sense to reduce the range of frequency variation of said signal as the apparent velocity of the object varies over said predetermined range; and means responsive to the frequency of said signal for developing an effect representative of the apparent image velocity.

9. A system responsive to the apparent velocity of a relatively moving object over a predetermined range of velocities comprising: optical means for forming at a focal plane an image of the relatively moving object; an elongated translucent strip having an opaque transverse repetitive pattern disposed substantially in said focal plane and movable thereby in the direction of image motion; motor means for continuously driving said strip; a photocell; optical means for focusing on said photocell the image on said strip; circuit means including said photocell for developing a periodic first electrical signal of a frequency varying with the velocity of the image at the focal plane relative to said repetitive pattern and including undesired unidirectional and low-frequency components; a second photocell; optical means for focusing on said second photocell an image similar to said focal plane image but independent of said pattern for developing a second electrical signal; circuit means differentially responsive to said electrical signals for regulating the speed of said motor means in a sense to reduce the range of frequency variation of said signal as the apparent velocity of the object varies over said predetermined range; and means responsive to the frequency of said signal for developing an effect representative of the apparent image velocity.

10. A system responsive to the apparent velocity of a relatively moving object in the direction of relative movement over a predetermined range of velocities comprising: optical means for forming at each of two focal planes an image of the relatively moving object; a pair of elongated translucent strips having oppositely inclined opaque repetitive patterns each disposed substantially in one of said focal planes and movable thereby in the direction of image motion; a pair of motor means for continuously individually driving said strips; a pair of photoelectric means for developing periodic electrical signals of frequencies individually varying with the velocities of the images at the focal planes relative to their respective repetitive patterns; a pair of circuit means individually responsive to said electrical signals for regulating the speeds of said motor means in senses to reduce the range of frequency variation of said signals as the apparent velocity of the object varies over said predetermined range; differential means responsive to inequality of the apparent velocities of said images at their respective focal planes for adjusting the orientation of the system to restore said apparent image velocities to equality; and means responsive to the frequency of said signal for developing an effect representative of the apparent image velocity in the direction of relative movement.

11. A system responsive to the apparent velocity of a relatively moving object in the direction of relative movement over a predetermined range of velocities comprising: optical means for forming at each of two focal planes an image of the relatively moving object; a pair of elongated translucent strips having oppositely inclined opaque repetitive patterns each disposed substantially in one of said focal planes and movable thereby in the direction of image motion; a pair of motor means for continuously individually driving said strips; a pair of photoelectric means for developing periodic electrical signals of frequencies individually varying with the velocities of the images at the focal planes relative to their respective repetitive patterns; a pair of circuit means individually responsive to said electrical signals for regulating the speeds of said motor means in senses to reduce the range of frequency variation of said signals as the apparent velocity of the object varies over said predetermined range; differential means responsive to inequality of the apparent velocities of said images at their respective focal planes for adjusting the orientation of the system to restore said apparent image velocities to equality; a pair of electrical generators individually driven by said motor means; and a voltage divider having an adjustable tap actuated by said differential means and connected across at least one of said electrical generators, whereby the signal appearing between said tap and one terminal of said voltage divider is representative of the apparent image velocity in the heading direction.

12. A system responsive to the apparent velocity of a relatively moving object over a predetermined range of velocities comprising: optical means for forming at a focal plane an image of the relatively moving object; an elongated translucent strip having an opaque transverse repetitive pattern disposed substantially in said focal plane and movable thereby in the direction of image motion; supply circuit terminals adapted to be energized by an alternating potential subject to undesirable variations in frequency; motor means connected to be energized from said terminals for continuously driving said strip; photoelectric means for developing a periodic electrical signal of a frequency varying with the velocity of the image at the focal plane relative to said repetitive pattern; circuit means responsive to said electrical signal for regulating the speed of said motor means in a sense to reduce the range of frequency variation of said signal as the apparent velocity of the object varies over said predetermined range; means responsive to the frequency of said signal for developing an effect representative of the apparent image velocity; and means responsive to the variations in frequency of said potential for modifying said effect to derive an effect proportional to apparent image velocity.

13. A system responsive to the apparent velocity of a relatively moving object over a predetermined range of velocities comprising: optical means for forming at a focal plane an image of the relatively moving object; an elongated translucent strip having an opaque transverse repetitive pattern disposed substantially in said focal plane and movable thereby in the direction of image motion; supply circuit terminals adapted to be energized by an alternating potential subject to undesirable variations in frequency; motor means connected to be energized from said terminals for continuously driving said strip; photoelectric means for developing a periodic electrical signal of a frequency varying with the velocity of the image at the focal plane relative to said repetitive pattern; circuit means responsive to said electrical signal for regulating the speed of said motor means in a sense to reduce the range of frequency variation of said signal as the apparent velocity of the object varies over said predetermined range; a first electrical generator driven by said motor means for developing a second electrical signal; a second electrical generator driven synchronously with said alternating potential for developing a third electrical signal; and circuit means for differentially combining said second and third electrical signals to develop a resultant signal linearly representative of the apparent image velocity.

No references cited.